United States Patent
Yan et al.

(10) Patent No.: US 10,382,980 B2
(45) Date of Patent: Aug. 13, 2019

(54) SIGNAL TRANSMISSION METHOD, AND APPARATUS

(71) Applicant: Huawei Technologies Co., Ltd., Shenzhen (CN)

(72) Inventors: Hua Yan, Chengdu (CN); Lei Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/605,613

(22) Filed: May 25, 2017

(65) Prior Publication Data
US 2017/0265091 A1    Sep. 14, 2017

Related U.S. Application Data

(63) Continuation of application No. PCT/CN2014/092152, filed on Nov. 25, 2014.

(51) Int. Cl.
*H04W 24/02* (2009.01)
*H04W 74/00* (2009.01)
(Continued)

(52) U.S. Cl.
CPC .......... *H04W 24/02* (2013.01); *H04B 7/0632* (2013.01); *H04B 17/336* (2015.01);
(Continued)

(58) Field of Classification Search
CPC . H04W 24/02; H04W 24/10; H04W 72/0413; H04B 7/0632; H04B 7/0626; H04B 17/336; H04L 5/0048
See application file for complete search history.

(56) References Cited

U.S. PATENT DOCUMENTS

| 2006/0148414 A1 | 7/2006 | Tee et al. |
| 2014/0112254 A1 | 4/2014 | Lindoff et al. |
| 2015/0045008 A1 | 2/2015 | Karla |

FOREIGN PATENT DOCUMENTS

| CN | 101390323 A | 3/2009 |
| CN | 103546653 A | 1/2014 |

(Continued)

OTHER PUBLICATIONS

Donthi et al., "An Accurate Model for EESM and its Application to Analysis of CQI Feedback Schemes and Scheduling in LTE," IEEE Transactions on Wireless Communications, vol. 10, No. 10, pp. 3436-3448, XP11389666A, Institute of Electrical and Electronics Engineers, New York, New York (Oct. 2011).

(Continued)

*Primary Examiner* — Jamal Javaid
(74) *Attorney, Agent, or Firm* — Leydig, Voit & Mayer, Ltd.

(57) ABSTRACT

The present invention relates to the field of mobile communications technologies, and in particular, to a signal transmission method, and an apparatus. In this solution, a technical feature of sending, to a receive end, an alternative transmission configuration corresponding to a selected first CQI is used. In this technical feature, the alternative transmission configuration sent to the receive end is an alternative transmission configuration corresponding to the selected first CQI. The technical feature can overcome disadvantages of relatively low accuracy of a signal obtained through demodulation by the receive end and relatively high feedback overheads in a signal transmission process. Therefore, the present invention can overcome the disadvantages of relatively low accuracy of a signal obtained through demodulation by the receive end and relatively high feedback overheads in the signal transmission process.

16 Claims, 6 Drawing Sheets

(51) Int. Cl.
    *H04B 17/336*     (2015.01)
    *H04B 7/06*     (2006.01)
    *H04L 1/00*     (2006.01)
    *H04L 5/00*     (2006.01)
    *H04L 1/20*     (2006.01)

(52) U.S. Cl.
    CPC .......... *H04L 1/0026* (2013.01); *H04L 5/0048* (2013.01); *H04L 5/0057* (2013.01); *H04W 74/00* (2013.01); *H04L 1/20* (2013.01)

(56) References Cited

FOREIGN PATENT DOCUMENTS

| | | | | |
|---|---|---|---|---|
| CN | 103718636 A | 4/2014 | | |
| CN | 104081807 A | 10/2014 | | |
| EP | 1750399 A1 * | 2/2007 | ............. | H04B 7/063 |
| EP | 1750399 A1 | 2/2007 | | |
| EP | 2434789 A1 | 3/2012 | | |

OTHER PUBLICATIONS

Chen et al., "A Novel MCS Selection Criterion for Supporting AMC in LTE System," 2010 International Conference on Computer Application and System Modeling (ICCASM 2010), pp. 598-603, Institute of Electrical and Electronics Engineers, New York, New York (2010).

* cited by examiner

SIGNAL TRANSMISSION METHOD, AND APPARATUS

CROSS-REFERENCE TO RELATED APPLICATIONS

This application is a continuation of International Application No. PCT/CN2014/092152, filed on Nov. 25, 2014, the disclosure of which is hereby incorporated by reference in its entirety.

TECHNICAL FIELD

Embodiments of the present invention relate to the field of communications technologies, and in particular, to a signal transmission method, and an apparatus.

BACKGROUND

In a signal transmission process, parameters such as a waveform, a subcarrier spacing, and a symbol period need to be selected. Currently, the parameters such as the subcarrier spacing, symbol period, and waveform are selected according to a ratio of multipath delay spread and Doppler spread of a channel.

Specifically, during selection, first, $\tau_{max}$, $\tau_{ms}$, and $f_d$ of a channel are obtained through estimation. During selection of a waveform parameter, if a waveform satisfies $$\frac{W_t}{W_f} = \frac{\tau_{max}}{f_d} \text{ or} \qquad \text{(formula 1)}$$

$$\frac{W_t}{W_f} = 1.5 \frac{\tau_{rms}}{f_d}, \qquad \text{(formula 2)}$$

the waveform is selected. During selection of a symbol period and a subcarrier spacing, if a symbol period and a subcarrier spacing satisfy $$\frac{T}{F} = \frac{\tau_{max}}{f_d} \text{ or} \qquad \text{(formula 3)}$$

$$\frac{T}{F} = 1.5 \frac{\tau_{rms}}{f_d}, \qquad \text{(formula 4)}$$

the symbol period and the subcarrier spacing are selected, where $W_1$ is waveform time spread, $W_f$ is waveform frequency spread, T is the symbol period, F is the subcarrier spacing, $\tau_{max}$ is maximum channel multipath delay spread, $f_d$ is maximum channel Doppler spread, and $\tau_{ms}$ is root mean square delay spread of the channel.

A premise to ensure that the selected subcarrier spacing and symbol period are preferable configuration parameters is that a channel scattering function is a constant. However, this premise is difficult to satisfy in practice. If a channel does not satisfy the premise, but a transmit end still transmits a signal by using the selected waveform, subcarrier spacing, and symbol period, accuracy of a signal obtained through demodulation by a receive end receiving the signal is relatively low. In addition, the channel parameters $\tau_{max}$, $\tau_{ms}$, and $f_d$ that need to be obtained sometimes need to be fed back to the transmit end after being measured by the receive end (for example, user equipment feeds back the parameters to a base station after measurement). However, these parameters are continuous values, and feedback overheads after quantization are relatively high. Therefore, the foregoing method further has a disadvantage of relatively high overheads. Orthogonal frequency division multiplexing (OFDM) uses a rectangular waveform, and frequency spread $W_f$ of the rectangular waveform is infinite. Therefore, the foregoing method is not applicable to configurations of the subcarrier spacing and the symbol period in an OFDM system. Therefore, the current signal transmission method has disadvantages of relatively low accuracy of a signal obtained through demodulation by the receive end and relatively high feedback overheads.

SUMMARY

Embodiments of the present invention provide a signal transmission method, and an apparatus, to overcome disadvantages of relatively low accuracy of a signal obtained through demodulation by a receive end and relatively high feedback overheads in a signal transmission process.

According to a first aspect, a signal transmission method is provided, including:

calculating a channel quality indicator CQI of each of at least two groups of alternative transmission configurations, where the alternative transmission configuration includes at least one of the following: a waveform parameter, a subcarrier spacing parameter, or a symbol period parameter;

selecting a first CQI from all the calculated CQIs; and sending, to a receive end, an alternative transmission configuration corresponding to the selected first CQI, so that the receive end transmits a signal according to the alternative transmission configuration.

With reference to the first aspect, in a first possible implementation manner, the calculating a channel quality indicator CQI of each of at least two groups of alternative transmission configurations specifically includes:

if the receive end uses one frequency range during signal transmission, calculating a CQI of each of at least two groups of alternative transmission configurations in the one frequency range; or if the receive end uses at least two frequency ranges during signal transmission, calculating, for any one of the at least two frequency ranges, a CQI of each of at least two groups of alternative transmission configurations in the any one frequency range.

With reference to the first possible implementation manner of the first aspect, in a second possible implementation manner, the calculating a channel quality indicator CQI of each of at least two groups of alternative transmission configurations in the any one frequency range specifically includes:

determining a channel measurement result of the any one frequency range;

for any one of the at least two groups of alternative transmission configurations, separately performing the following:

calculating a signal to interference plus noise ratio according to the channel measurement result and the any one group of alternative transmission configurations; and determining the CQI according to the calculated signal to interference plus noise ratio.

With reference to the second possible implementation manner of the first aspect, in a third possible implementation manner, the calculating a signal to interference plus noise ratio according to the channel measurement result and the any one group of alternative transmission configurations specifically includes:

obtaining a transmission configuration corresponding to the channel measurement result; and if the any one group of alternative transmission configurations is the same as the obtained transmission configuration, using the signal to interference plus noise ratio, which is calculated according to the channel measurement result and the any one group of alternative transmission configurations, as a signal to interference plus noise ratio of the any one group of alternative transmission configurations.

With reference to the second possible implementation manner of the first aspect, in a fourth possible implementation manner, the calculating a signal to interference plus noise ratio according to the channel measurement result and the any one group of alternative transmission configurations specifically includes:

obtaining a transmission configuration corresponding to the channel measurement result; and if the any one group of alternative transmission configurations is different from the obtained transmission configuration, calculating a signal to interference plus noise ratio of the obtained transmission configuration, and a signal to interference plus noise ratio increment of a signal to interference plus noise ratio of the any one group of alternative transmission configurations compared with the signal to interference plus noise ratio of the obtained transmission configuration; and calculating the signal to interference plus noise ratio of the any one group of alternative transmission configurations according to the signal to interference plus noise ratio of the obtained transmission configuration and the signal to interference plus noise ratio increment; or if the any one group of alternative transmission configurations is different from the obtained transmission configuration, calculating an interference amount between a channel estimation result and a symbol according to the channel measurement result and the any one group of alternative transmission configurations, and calculating a signal to interference plus noise ratio of the any one group of alternative transmission configurations according to the interference amount between the channel estimation result and the symbol.

With reference to any one of the first aspect or the first to the fourth possible implementation manners of the first aspect, in a fifth possible implementation manner, the selecting a first CQI from all the calculated CQIs specifically includes:

if the receive end uses one frequency range during signal transmission, selecting a largest CQI from all CQIs calculated for the one frequency range; and using the largest CQI as the first CQI; or selecting a smallest CQI from all CQIs calculated for the one frequency range; and using the smallest CQI as the first CQI.

With reference to any one of the first aspect or the first to the fourth possible implementation manners of the first aspect, in a sixth possible implementation manner, the selecting a first CQI from all the calculated CQIs specifically includes:

if the receive end uses at least two frequency ranges during signal transmission, selecting, for any one of the at least two frequency ranges, a largest CQI from all CQIs calculated for the any one frequency range; and using a CQI, which is greater than a preset CQI threshold, in all selected largest CQIs as the first CQI; or sorting all selected largest CQIs in descending order; and using the first to $X^{th}$ largest CQIs as the first CQIs, where X is greater than or equal to 1 and is less than or equal to N, and N is a quantity of frequency ranges.

With reference to any one of the first aspect or the first to the fourth possible implementation manners of the first aspect, in a seventh possible implementation manner, the selecting a first CQI from all the calculated CQIs specifically includes:

if the receive end uses at least two frequency ranges during signal transmission, selecting, for any one of the at least two frequency ranges, a smallest CQI from all CQIs calculated for the any one frequency range; and using a CQI, which is less than a preset CQI threshold, in all selected smallest CQIs as the first CQI; or sorting all selected smallest CQIs in ascending order; and using the first to $X^{th}$ smallest CQIs as the first CQIs, where X is greater than or equal to 1 and is less than or equal to N, and N is a quantity of frequency ranges.

With reference to the sixth or the seventh possible implementation manner of the first aspect, in an eighth possible implementation manner, the preset CQI threshold is agreed upon by the receive end and a transmit end, or is specified by the receive end; and X is agreed upon by the receive end and the transmit end, or is specified by the receive end.

With reference to any one of the sixth to the eighth possible implementation manners of the first aspect, in a ninth possible implementation manner, the method further includes:

receiving the preset CQI threshold and/or X sent by the receive end.

With reference to any one of the fourth to the ninth possible implementation manners of the first aspect, in a tenth possible implementation manner, a frequency range used by the receive end during signal transmission is agreed upon by the transmit end and the receive end, or is specified by the receive end.

With reference to any one of the first to the ninth possible implementation manners of the first aspect, in an eleventh possible implementation manner, before the calculating a channel quality indicator CQI of each of at least two groups of alternative transmission configurations, the method further includes:

receiving information that is sent by the receive end and that is about a frequency range used by the receive end during signal transmission.

With reference to any one of the first to the eleventh possible implementation manners of the first aspect, in a twelfth possible implementation manner, after the selecting a first CQI from all the calculated CQIs, the method further includes:

if the receive end uses at least two frequency ranges during signal transmission, sending, to the receive end, a frequency range corresponding to each selected first CQI.

With reference to any one of the first aspect or the first to the twelfth possible implementation manners of the first aspect, in a thirteenth possible implementation manner, after the selecting a first CQI from all the calculated CQIs, the method further includes:

sending the first CQI to the receive end.

According to a second aspect, a signal transmission method is provided, including:

receiving an alternative transmission configuration that is sent by a transmit end and that corresponds to a first channel quality indicator CQI, where the first CQI is selected by the transmit end from CQIs calculated for all alternative transmission configurations, and the alternative transmission configuration includes at least one of the following: a waveform parameter, a subcarrier spacing parameter, or a symbol period parameter;

determining a transmission configuration according to the received alternative transmission configuration; and transmitting a signal according to the determined transmission configuration.

With reference to the second aspect, in a first possible implementation manner, before the determining a transmission configuration according to the received alternative transmission configuration, the method further includes:

if at least two frequency ranges are used during signal transmission, receiving a frequency range corresponding to each of the first CQIs, where the determining a transmission configuration according to the received alternative transmission configuration specifically includes:

determining, for any one of the at least two frequency ranges, a transmission configuration in the any one frequency range according to the alternative transmission configuration that corresponds to the first CQI corresponding to the any one frequency range.

With reference to the second aspect or the first possible implementation manner of the second aspect, in a second possible implementation manner, before the determining a transmission configuration according to the received alternative transmission configuration, the method further includes:

receiving the first CQI, where the determining a transmission configuration according to the received alternative transmission configuration specifically includes:

determining the transmission configuration according to the first CQI and the received alternative transmission configuration.

With reference to the first or the second possible implementation manner of the second aspect, in a third possible implementation manner, a frequency range used by a receive end during signal transmission is agreed upon by the transmit end and the receive end, or is specified by the receive end.

With reference to the first or the second possible implementation manner of the second aspect, in a fourth possible implementation manner, before the receiving an alternative transmission configuration that is sent by a transmit end and that corresponds to a first CQI, the method further includes:

sending, to the transmit end, information about all frequency ranges that are used by the receive end during signal transmission.

According to a third aspect, a transmit end is provided, including:

a calculation unit, configured to calculate a channel quality indicator CQI of each of at least two groups of alternative transmission configurations, where the alternative transmission configuration includes at least one of the following: a waveform parameter, a subcarrier spacing parameter, or a symbol period parameter;

a selection unit, configured to select a first CQI from all the calculated CQIs; and a sending unit, configured to send, to a receive end, an alternative transmission configuration corresponding to the selected first CQI, so that the receive end transmits a signal according to the alternative transmission configuration.

With reference to the third aspect, in a first possible implementation manner, the calculation unit is specifically configured to:

if the receive end uses one frequency range during signal transmission, calculate a CQI of each of at least two groups of alternative transmission configurations in the one frequency range; or if the receive end uses at least two frequency ranges during signal transmission, calculate, for any one of the at least two frequency ranges, a CQI of each of at least two groups of alternative transmission configurations in the any one frequency range.

With reference to the first possible implementation manner of the third aspect, in a second possible implementation manner, the calculation unit is specifically configured to:

determine a channel measurement result of the any one frequency range;

for any one of the at least two groups of alternative transmission configurations, separately perform the following:

calculating a signal to interference plus noise ratio according to the channel measurement result and the any one group of alternative transmission configurations; and determining the CQI according to the calculated signal to interference plus noise ratio.

With reference to the second possible implementation manner of the third aspect, in a third possible implementation manner, when calculating the signal to interference plus noise ratio according to the channel measurement result and the any one group of alternative transmission configurations, the calculation unit is specifically configured to:

obtain a transmission configuration corresponding to the channel measurement result; and if the any one group of alternative transmission configurations is the same as the obtained transmission configuration, use the signal to interference plus noise ratio, which is calculated according to the channel measurement result and the any one group of alternative transmission configurations, as a signal to interference plus noise ratio of the any one group of alternative transmission configurations.

With reference to the second possible implementation manner of the third aspect, in a fourth possible implementation manner, when calculating the signal to interference plus noise ratio according to the channel measurement result and the any one group of alternative transmission configurations, the calculation unit is specifically configured to:

obtain a transmission configuration corresponding to the channel measurement result; and if the any one group of alternative transmission configurations is different from the obtained transmission configuration, calculate a signal to interference plus noise ratio of the obtained transmission configuration, and a signal to interference plus noise ratio increment of a signal to interference plus noise ratio of the any one group of alternative transmission configurations compared with the signal to interference plus noise ratio of the obtained transmission configuration; and calculate the signal to interference plus noise ratio of the any one group of alternative transmission configurations according to the signal to interference plus noise ratio of the obtained transmission configuration and the signal to interference plus noise ratio increment; or if the any one group of alternative transmission configurations is different from the obtained transmission configuration, calculate an interference amount between a channel estimation result and a symbol according to the channel measurement result and the any one group of alternative transmission configurations, and calculate a signal to interference plus noise ratio of the any one group of alternative transmission configurations according to the interference amount between the channel estimation result and the symbol.

With reference to any one of the third aspect or the first to the fourth possible implementation manners of the third aspect, in a fifth possible implementation manner, the selection unit is specifically configured to:

if the receive end uses one frequency range during signal transmission, select a largest CQI from all CQIs calculated for the one frequency range; and use the largest CQI as the first CQI; or select a smallest CQI from all CQIs calculated for the one frequency range; and use the smallest CQI as the first CQI.

With reference to any one of the third aspect or the first to the fourth possible implementation manners of the third aspect, in a sixth possible implementation manner, the selection unit is specifically configured to:

if the receive end uses at least two frequency ranges during signal transmission, select, for any one of the at least two frequency ranges, a largest CQI from all CQIs calculated for the any one frequency range; and use a CQI, which is greater than a preset CQI threshold, in all selected largest CQIs as the first CQI; or sort all selected largest CQIs in descending order; and use the first to $X^{th}$ largest CQIs as the first CQIs, where X is greater than or equal to 1 and is less than or equal to N, and N is a quantity of frequency ranges.

With reference to any one of the third aspect or the first to the fourth possible implementation manners of the third aspect, in a seventh possible implementation manner, the selection unit is specifically configured to:

if the receive end uses at least two frequency ranges during signal transmission, select, for any one of the at least two frequency ranges, a smallest CQI from all CQIs calculated for the any one frequency range; and use a CQI, which is less than a preset CQI threshold, in all selected smallest CQIs as the first CQI; or sort all selected smallest CQIs in ascending order; and use the first to $X^{th}$ smallest CQIs as the first CQIs, where X is greater than or equal to 1 and is less than or equal to N, and N is a quantity of frequency ranges.

With reference to the sixth or the seventh possible implementation manner of the third aspect, in an eighth possible implementation manner, the preset CQI threshold is agreed upon by the receive end and the transmit end, or is specified by the receive end; and X is agreed upon by the receive end and the transmit end, or is specified by the receive end.

With reference to any one of the sixth to the eighth possible implementation manners of the third aspect, in a ninth possible implementation manner, the transmit end further includes a receiving unit, configured to receive the preset CQI threshold and/or X sent by the receive end.

With reference to any one of the fourth to the ninth possible implementation manners of the third aspect, in a tenth possible implementation manner, a frequency range used by the receive end during signal transmission is agreed upon by the transmit end and the receive end, or is specified by the receive end.

With reference to any one of the first to the ninth possible implementation manners of the third aspect, in an eleventh possible implementation manner, the transmit end further includes a receiving unit, where the receiving unit is configured to receive information that is sent by the receive end and that is about a frequency range used by the receive end during signal transmission.

With reference to any one of the first to the eleventh possible implementation manners of the third aspect, in a twelfth possible implementation manner, the sending unit is further configured to:

if the receive end uses at least two frequency ranges during signal transmission, send, to the receive end, a frequency range corresponding to each selected first CQI.

With reference to any one of the third aspect or the first to the twelfth possible implementation manners of the third aspect, in a thirteenth possible implementation manner, the sending unit is further configured to:

send the first CQI to the receive end.

According to a fourth aspect, a receive end is provided, including:

a receiving unit, configured to receive an alternative transmission configuration that is sent by a transmit end and that corresponds to a first channel quality indicator CQI, where the first CQI is selected by the transmit end from CQIs calculated for all alternative transmission configurations, and the alternative transmission configuration includes at least one of the following: a waveform parameter, a subcarrier spacing parameter, or a symbol period parameter;

a determining unit, configured to determine a transmission configuration according to the received alternative transmission configuration; and a transmission unit, configured to transmit a signal according to the determined transmission configuration.

With reference to the fourth aspect, in a first possible implementation manner, the receiving unit is further configured to:

if at least two frequency ranges are used during signal transmission, receive a frequency range corresponding to each of the first CQIs; and the determining unit is specifically configured to:

determine, for any one of the at least two frequency ranges, a transmission configuration in the any one frequency range according to the alternative transmission configuration that corresponds to the first CQI corresponding to the any one frequency range.

With reference to the fourth aspect or the first possible implementation manner of the fourth aspect, in a second possible implementation manner, the receiving unit is further configured to:

receive the first CQI; and the determining unit is specifically configured to:

determine the transmission configuration according to the first CQI and the received alternative transmission configuration.

With reference to the first or the second possible implementation manner of the fourth aspect, in a third possible implementation manner, the frequency range used by a receive end during signal transmission is agreed upon by the transmit end and the receive end, or is specified by the receive end.

With reference to the first or the second possible implementation manner of the fourth aspect, in a fourth possible implementation manner, the receive end further includes a sending unit, where the sending unit is configured to:

send, to the transmit end, information about all frequency ranges used by the receive end during signal transmission.

In the present invention, an alternative transmission configuration corresponding to a selected first CQI is sent to a receive end. The alternative transmission configuration sent to the receive end is an alternative transmission configuration corresponding to the selected first CQI. Therefore, the present invention may overcome disadvantages of relatively low accuracy of a signal obtained through demodulation by the receive end and relatively high feedback overheads in a signal transmission process.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, implementation manners of the present invention are described in detail with reference to the accompanying drawings. It should be understood that the embodiments described herein are merely used to illustrate and explain the present invention, but are not intended to limit the present invention. In addition, the embodiments of the present application and features in the embodiments may be mutually combined in a case in which they do not conflict with each other.

In the following, the implementation manners of the present invention are described in detail with reference to the accompanying drawings.

Figure 1A:
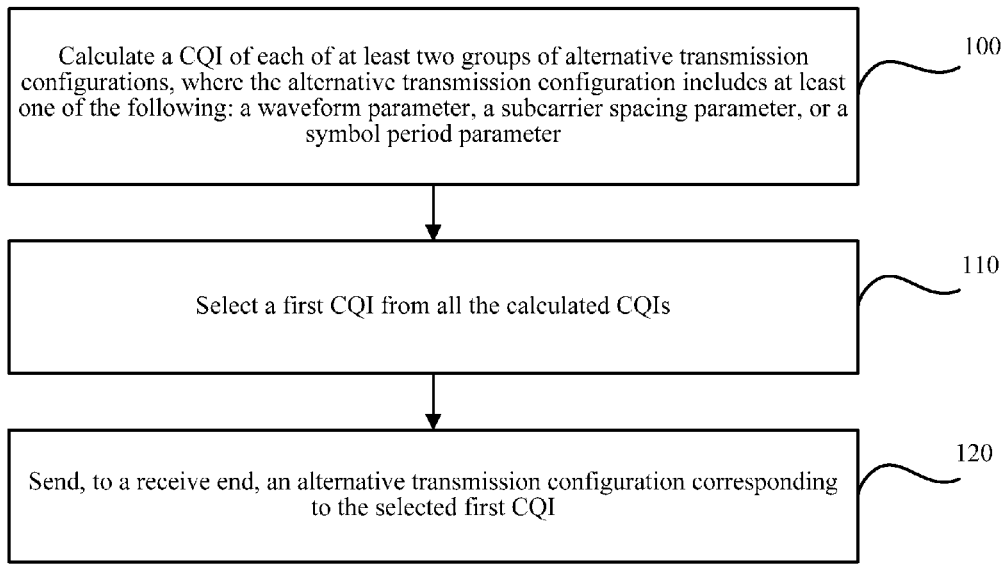
FIG. 1A is a flowchart of signal transmission according to an embodiment of the present invention.

Referring to FIG. 1A, in an embodiment of the present invention, a signal transmission procedure is as follows:

Step 100: Calculate a CQI of each of at least two groups of alternative transmission configurations, where the alternative transmission configuration includes at least one of the following: a waveform parameter, a subcarrier spacing parameter, or a symbol period parameter.

Step 110: Select a first CQI from all the calculated CQIs.

Step 120: Send, to a receive end, an alternative transmission configuration corresponding to the selected first CQI, so that the receive end transmits a signal according to the alternative transmission configuration.

In this embodiment of the present invention, when the CQI of each of the at least two groups of alternative transmission configurations is calculated, if the receive end uses one frequency range during signal transmission, a CQI of each of at least two groups of alternative transmission configurations in the one frequency range is calculated; or if the receive end uses at least two frequency ranges during signal transmission, for any one of the at least two frequency ranges, a CQI of each of at least two groups of alternative transmission configurations in the any one frequency range is calculated.

That is, if the receive end uses one frequency range during signal transmission, a CQI of each of at least two groups of alternative transmission configurations in the one frequency range is directly calculated. If the receive end uses at least two frequency ranges during signal transmission, for each frequency range, a CQI of each of at least two groups of alternative transmission configurations in the frequency range needs to be calculated.

In this embodiment of the present invention, there are multiple manners for calculating the channel quality indicator CQI of each of the at least two groups of alternative transmission configurations. Optionally, the following manner may be used:

determining a channel measurement result of the any one frequency range;

for any one of the at least two groups of alternative transmission configurations, separately performing the following:

calculating a signal to interference plus noise ratio according to the channel measurement result and the any one group of alternative transmission configurations; and determining the CQI according to the calculated signal to interference plus noise ratio.

In this embodiment of the present invention, the channel measurement result may be determined in the following manner:

receiving a preset pilot symbol sent by the receive end by using a transmission configuration; and obtaining the channel measurement result according to a received signal at a location of the received pilot symbol and the preset pilot symbol.

In this embodiment of the present invention, there are multiple manners for calculating the signal to interference plus noise ratio according to the channel measurement result and the any one group of alternative transmission configurations. Optionally, the following manner may be used:

obtaining a transmission configuration corresponding to the channel measurement result; and if the any one group of alternative transmission configurations is the same as the obtained transmission configuration, using the signal to interference plus noise ratio, which is calculated according to the channel measurement result and the any one group of alternative transmission configurations, as a signal to interference plus noise ratio of the any one group of alternative transmission configurations.

That is, when the channel measurement result is obtained, the receive end also needs to use a particular transmission configuration when sending the pilot symbol. During calculation of a signal to interference plus noise ratio of one group of alternative transmission configurations, if the group of alternative transmission configurations is the same as the particular transmission configuration used to send the pilot symbol, the signal to interference plus noise ratio calculated according to the channel measurement result and the particular transmission configuration is used as a signal to interference plus noise ratio of the group of alternative transmission configurations.

According to a basic principle of OFDM, when subcarrier spacings are different, anti-Doppler frequency shift capabilities of OFDM signals are different. Generally, a larger subcarrier spacing indicates a stronger anti-Doppler frequency shift capability. A smaller subcarrier spacing indicates a weaker anti-Doppler frequency shift capability. Therefore, it is necessary to adaptively adjust a subcarrier spacing, to adapt to different channel scenarios.

For the OFDM, the receive end generally sends a pilot symbol for channel measurement of the transmit end. The transmit end generally needs to perform channel measurement according to the transmission configuration that is used by the receive end when sending the pilot symbol. For example, in a Long Term Evolution (LTE) system, a base station sends a pilot symbol according to a subcarrier spacing of 15 KHz. Therefore, a terminal may perform channel measurement according to a transmission configuration that is used by the base station when sending the pilot symbol, to obtain a channel coefficient H and an average interference noise power $\sigma_{I+n}^2$ of the transmission configuration. A specific measurement method may be implemented by using the prior art, and details are not described herein. Further, a signal to interference plus noise ratio (SINR) may be calculated according to H and $\sigma_{I+n}^2$.

In an OFDM system, if the alternative transmission configuration is different from the particular transmission configuration used to transmit the pilot symbol, the channel coefficient and the interference noise power cannot be directly measured. During implementation, a signal to interference plus noise ratio increment of the alternative transmission configuration compared with a signal to interference plus noise ratio of the particular transmission configuration used to transmit the pilot symbol may be determined by means of emulation in advance or according to an empirical value. Further, a sum of the signal to interference plus noise ratio increment and the SINR of the transmission configuration used to send the pilot symbol is used as an SINR of the alternative transmission configuration different from the transmission configuration used to transmit the pilot symbol.

That is, for the OFDM system, one group of alternative transmission configurations may be different from the particular transmission configuration used to send the pilot symbol. In this case, the following manner may be used:

obtaining a transmission configuration corresponding to the channel measurement result; and if the any one group of alternative transmission configurations is different from the particular transmission configuration used to transmit the pilot symbol, calculating a signal to interference plus noise ratio of the particular transmission configuration, and a signal to interference plus noise ratio increment of a signal to interference plus noise ratio of the any one group of alternative transmission configurations compared with the signal to interference plus noise ratio of the particular transmission configuration; and calculating the signal to interference plus noise ratio of the any one group of alternative transmission configurations according to the signal to interference plus noise ratio of the particular transmission configuration and the signal to interference plus noise ratio increment.

For a filter bank multi-carrier (FBMC) system, one group of alternative transmission configurations may be different from the particular transmission configuration used to send the pilot symbol. In this case, the following manner may be used:

obtaining a transmission configuration corresponding to the channel measurement result; and if the any one group of alternative transmission configurations is different from the obtained transmission configuration, calculating an interference amount between a channel estimation result and a symbol according to the channel measurement result and the any one group of alternative transmission configurations, and calculating a signal to interference plus noise ratio of the any one group of alternative transmission configurations according to the interference amount between the channel estimation result and the symbol.

Figure 1B:
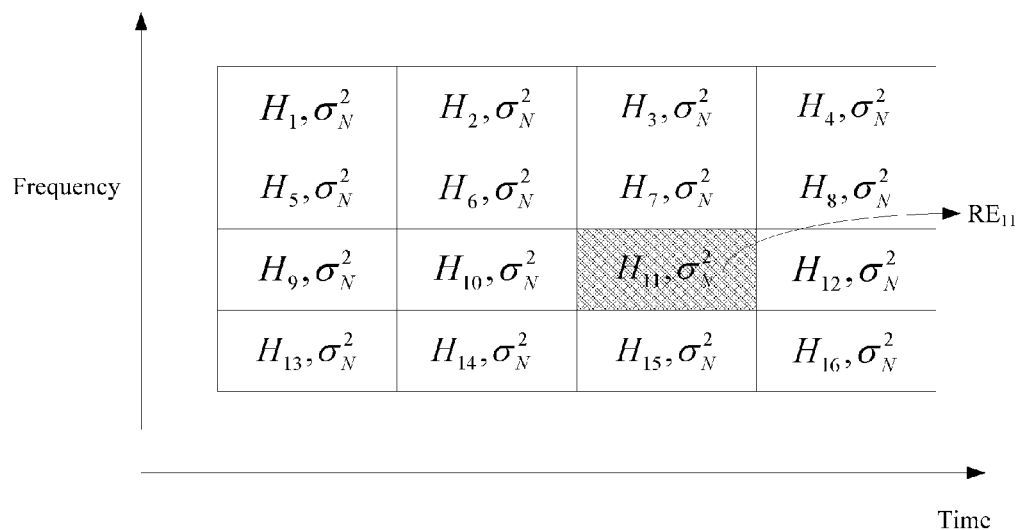
FIG. 1B is a schematic diagram of an RE according to an embodiment of the present invention.
Figure 1C:
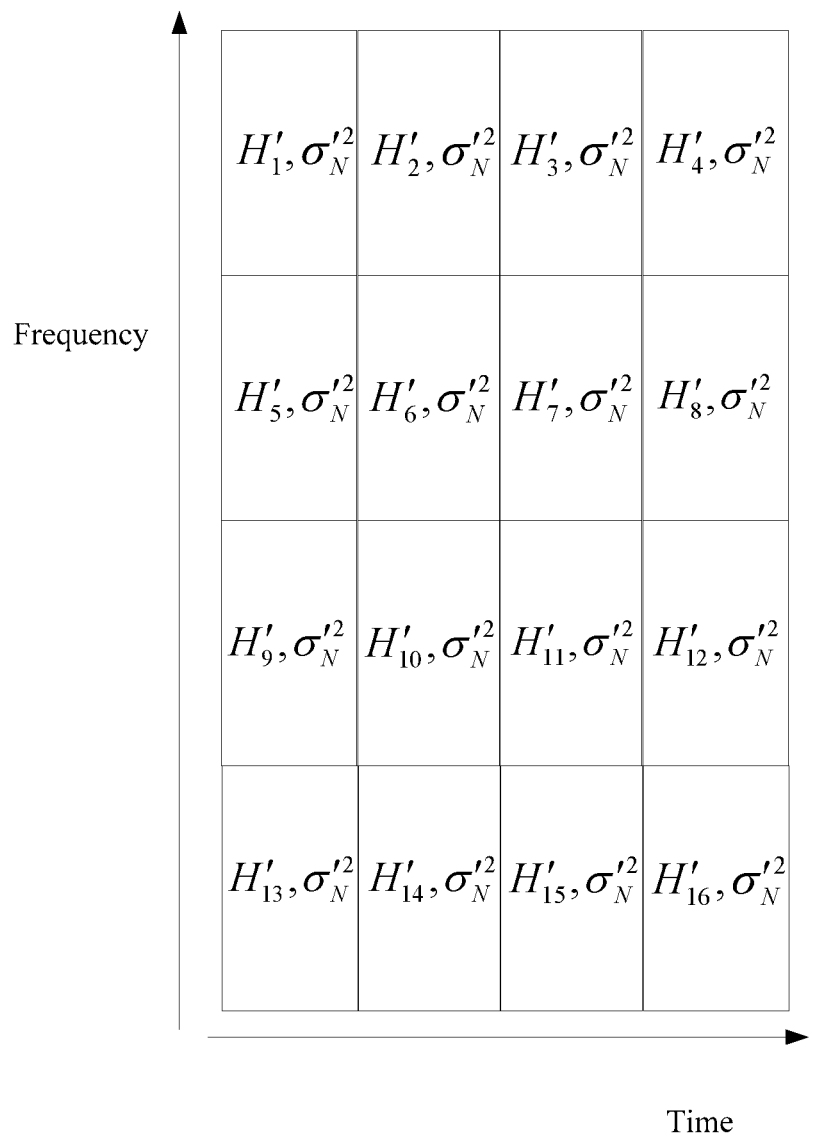
FIG. 1C is another schematic diagram of an RE according to an embodiment of the present invention.

For example, each grid in FIG. 1B and FIG. 1C represents a resource element (RE). $H_i$ in a grid of FIG. 1B represents a first channel coefficient on an RE in a first group of alternative transmission configurations, and $\sigma_N^2$ represents a first average interference noise power on each RE in the first group of alternative transmission configurations. $H_i'$ in a grid of FIG. 1C represents a second channel coefficient on an RE in a second group of alternative transmission configurations, and $\sigma'_N^2$ represents a second average interference noise power on each RE in the second group of alternative transmission configurations. The REs in FIG. 1B have a longer symbol period and a narrower subcarrier spacing compared with the REs in FIG. 1C. The channel coefficient also changes correspondingly because of the different symbol periods and subcarrier spacings. That is, generally, $H_i$ in FIG. 1B is different from $H_i'$ in FIG. 1C.

Using the RE (recorded as $RE_{11}$) on which $H_{11}$ is located in FIG. 1B as an example, an SINR on $RE_{11}$ is calculated, and a signal received on $RE_{11}$ is:

$$Y_{11} = H_{11}X_{11} + \sum_{i \in \Phi_{11}} H_i X_i j\alpha_i + N_{11} \quad \text{(Formula 1)}$$

where $H_{11}$ represents a channel coefficient on $RE_{11}$, $X_{11}$ represents a real number symbol sent on $RE_{11}$, $\Phi_{11}$ represents a set of numbers of REs interfering with $RE_{11}$, where generally, REs interfering with an RE are around the RE, and a specific interference situation depends on a setting of a filter, $H_i$ represents a channel coefficient corresponding to an $i^{th}$ RE in $\Phi_{11}$, $X_i$ represents a real number symbol sent on the $i^{th}$ RE in $\Phi_{11}$, $j\alpha_i$ represents an interference coefficient of the $i^{th}$ RE in $\Phi_{11}$ with respect to $RE_{11}$, j is an imaginary number unit, $\alpha_i$ is a real number and is determined by a used alternative filter (that is, a waveform in an alternative transmission configuration), $N_{11}$ is noise on $RE_{11}$, and the following is obtained by equalizing a received signal $Y_{11}$ and taking a real part:

$$Y_{11} = X_{11} - \sum_{i \in \Phi_{11}} \text{Im}\left\{\frac{H_i}{H_{11}}\right\} X_i \alpha_i + \text{Re}\left\{\frac{N_{11}}{H_{11}}\right\} \quad \text{(Formula 2)}$$

The SINR is calculated according to Formula 2:

$$SINR = \frac{\sigma_X^2}{\frac{1}{\|H_{11}\|^2}\sigma_N^2 + \sum_{i \in \Phi_{11}} \left(\text{Im}\left\{\frac{H_i}{H_{11}}\right\}\right)^2 \sigma_X^2 \alpha_i^2} \quad \text{(Formula 3)}$$

where $\sigma_N^2$ represents an average noise power of $RE_{11}$, because a real part of the noise power is taken, $\sigma_N^2$ is merely a half of a power of complex number noise $N_{11}$, and $\sigma_x^2$ represents a power of the sent real number symbol $X_{11}$.

It should be noted that in Formula 3, $$\frac{1}{\|H_{11}\|^2} \text{ and } \left(\text{Im}\left\{\frac{H_i}{H_{11}}\right\}\right)^2$$

are both related to the subcarrier spacing parameter and the symbol period parameter, $\alpha_t^2$ is related to the waveform parameter. Therefore, SINRS calculated by using different alternative transmission configurations are generally different.

Calculation of an SINR on one RE is described above. A group of alternative transmission configurations includes multiple REs. As shown in FIG. 1B or FIG. 1C, each group of alternative transmission configurations includes 16 REs. Then calculated SINRs on 16 REs respectively are combined together, for example, combined by means of exponential effective signal-to-interference ratio mapping (EESM). A combined SINR is used as an SINR of a group of alternative transmission configurations. A CQI may be obtained by looking up a table according to the combined SINR. The CQI is a number, indicating channel quality. A calculation result of an SINR on each RE is related to the subcarrier spacing parameter, the symbol period parameter, and the waveform parameter. Therefore, different CQIs are obtained according to different alternative transmission configurations. These CQIs reflect differences of transmission performance due to different alternative transmission configurations.

It should be further noted that SINRs may be combined in different frequency ranges, for example, may be combined on all frequencies of a symbol. For example, in FIG. 1B, an SINR combination range may be four REs in the first column (that is, the first symbol); or combination may be performed on some subbands of a symbol. For example, in FIG. 1B, an SINR combination range is REs on which $H_1$ and $H_5$ are located in the first column; or combination may be performed by using SINRs on different subcarriers on multiple symbols. For example, in FIG. 1B, an SINR combination range is REs on which $H_1$, $H_3$, $H_6$, $H_5$, $H_9$, $H_{11}$, $H_{14}$, and $H_{16}$ are located.

In this embodiment of the present invention, when the first CQI is selected from all the calculated CQIs, the following manner may be used:

if the receive end uses one frequency range during signal transmission, and a larger signal to interference plus noise ratio corresponds to a larger CQI, selecting a largest CQI from all CQIs calculated for the one frequency range; and using the largest CQI as the first CQI; or if a larger signal to interference plus noise ratio corresponds to a smaller CQI, selecting a smallest CQI from all CQIs calculated for the one frequency range; and using the smallest CQI as the first CQI.

That is, regardless of whether a larger signal to interference plus noise ratio corresponds to a larger CQI or a smaller CQI, the signal to interference plus noise ratio corresponding to the selected first CQI is always the largest.

In this embodiment of the present invention, when the first CQI is selected from all the calculated CQIs, the following manner may be used:

if the receive end uses at least two frequency ranges during signal transmission, selecting, for any one of the at least two frequency ranges, a largest CQI from all CQIs calculated for the any one frequency range; and using a CQI, which is greater than a preset CQI threshold, in all selected largest CQIs as the first CQI; or sorting all selected largest CQIs in descending order; and using the first to $X^{th}$ largest CQIs as the first CQIs, where X is greater than or equal to 1 and is less than or equal to N, and N is a quantity of frequency ranges.

For example, there are three frequency ranges in total: frequency range 1, frequency range 2, and frequency range 3. Alternative transmission configurations in all the frequency ranges are the same. Each frequency range has six groups of alternative transmission configurations. Six CQIs are calculated for frequency range 1, and a largest CQI is CQI1. Six CQIs are calculated for frequency range 2, and a largest CQI is CQI2. Six CQIs are calculated for frequency range 3, and a largest CQI is CQI3. A CQI, which is greater than the preset CQI threshold, among CQI1, CQI2, and CQI3 is used as the first CQI; or CQI1, CQI2, and CQI3 are sorted in descending order: CQI2, CQI1, and CQI3, and first two CQIs, that is, CQI2 and CQI1 are used as the first CQIs.

In the foregoing description, the largest CQI is selected. Certainly, in an actual application, a larger signal to interference plus noise ratio may correspond to a smaller CQI. In this case, when the first CQI is selected from all the calculated CQIs, the following manner may be used:

if the receive end uses at least two frequency ranges during signal transmission, selecting, for any one of the at least two frequency ranges, a smallest CQI from all CQIs calculated for the any one frequency range; and using a CQI, which is less than a preset CQI threshold, in all selected smallest CQIs as the first CQI; or sorting all selected smallest CQIs in ascending order; and using the first to $X^{th}$ smallest CQIs as the first CQIs, where X is greater than or equal to 1 and is less than or equal to N, and N is a quantity of frequency ranges.

In this embodiment of the present invention, optionally, the preset CQI threshold may be agreed upon by the receive end and the transmit end, or is specified by the receive end; and X is agreed upon by the receive end and the transmit end, or is specified by the receive end.

When the preset CQI threshold and X are specified by the receive end, the following operation is further included:

receiving the preset CQI threshold and/or X sent by the receive end.

Similarly, the frequency range used by the receive end during signal transmission is agreed upon by the transmit end and the receive end, or may be specified by the receive end.

When the frequency range used by the receive end during signal transmission is specified by the receive end, before the channel quality indicator CQI of each of at least two groups of alternative transmission configurations is calculated, the following operation is further included:

receiving information that is sent by the receive end and that is about a frequency range used by the receive end during signal transmission.

In this embodiment of the present invention, if the receive end uses one frequency range during signal transmission, because the frequency range is agreed upon by the transmit end and the receive end, or is specified by the receive end, the receive end knows a frequency range in which better channel quality may be obtained when an alternative transmission configuration sent by the transmit end transmits a signal in the frequency range. Therefore, the frequency range corresponding to the first CQI does not need to be fed back. If multiple frequency ranges are used by the receive end during signal transmission, to enable the receive end to transmit, in a frequency range, the signal by using a transmission configuration corresponding to the frequency range, after the first CQI is selected from all the calculated CQIs, the following operation is further included:

if the receive end uses at least two frequency ranges during signal transmission, sending, to the receive end, a frequency range corresponding to each selected first CQI.

In this way, for any first CQI, the receive end selects a signal transmission configuration in a frequency range corresponding to the first CQI according to a transmission configuration corresponding to the first CQI.

If the receive end needs to send signals to multiple transmit ends, in this embodiment of the present invention, after the first CQI is selected from all the calculated CQIs, the following operation is further included:

sending the first CQI to the receive end.

In this way, after the receive end collects information about first CQIs of all transmit ends and comprehensively compares the first CQI of the transmit ends, a suitable receive end is scheduled to perform information transfer, thereby achieving an objective of effective information transfer by using a spectrum resource.

In this embodiment of the present invention, a CQI is a channel quality indicator, but a channel is affected by a subcarrier spacing, a symbol period, and a waveform configuration. Therefore, different CQIs calculated according to different alternative transmission configurations exactly reflect impact of different alternative transmission configurations on channel transmission performance. In addition, this solution is not limited to be used only when a condition that a channel scattering function is a constant is satisfied. Therefore, the present invention can overcome disadvantages of relatively low accuracy of a signal obtained through demodulation by the receive end, relatively high feedback overheads, and limited application scenarios in a signal transmission process.

Figure 2:
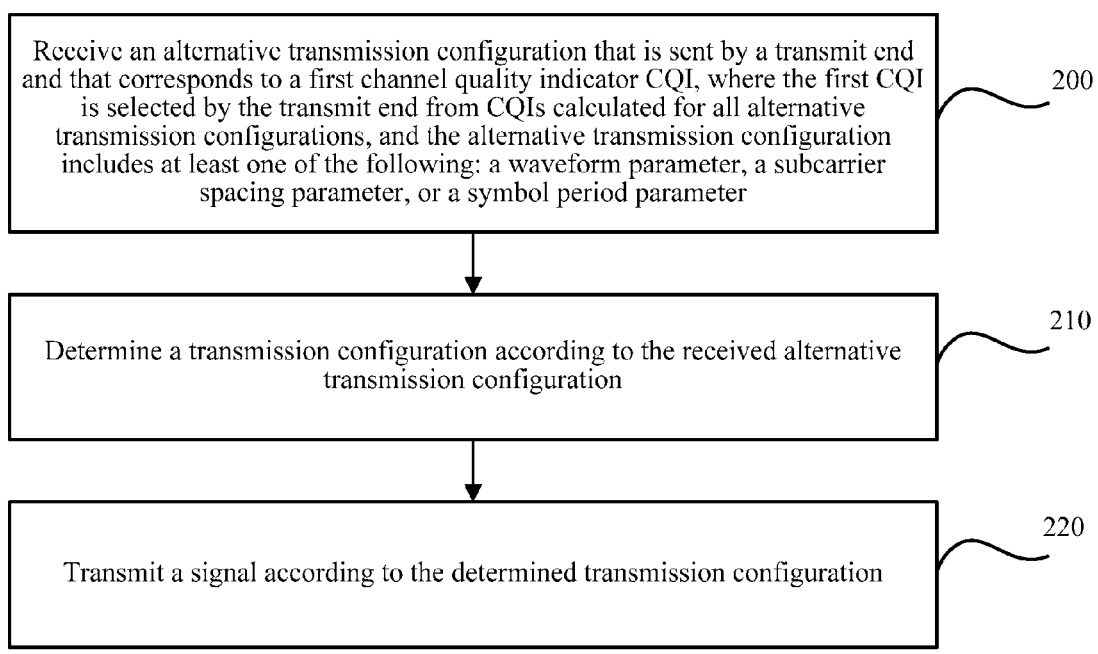
FIG. 2 is another flowchart of signal transmission according to an embodiment of the present invention.

Referring to FIG. 2, in an embodiment of the present invention, another signal transmission procedure is as follows:

Step 200: Receive an alternative transmission configuration that is sent by a transmit end and that corresponds to a first channel quality indicator CQI, where the first CQI is selected by the transmit end from CQIs calculated for all alternative transmission configurations, and the alternative transmission configuration includes at least one of the following: a waveform parameter, a subcarrier spacing parameter, or a symbol period parameter.

Step 210: Determine a transmission configuration according to the received alternative transmission configuration.

Step 220: Transmit a signal according to the determined transmission configuration.

In this embodiment of the present invention, if the receive end uses one frequency range during signal transmission, because the frequency range is agreed upon by the transmit end and the receive end, or is specified by the receive end, the receive end knows a frequency range in which better channel quality may be obtained when an alternative transmission configuration sent by the transmit end transmits a signal in the frequency range. Therefore, a frequency range corresponding to the first CQI does not need to be fed back. If multiple frequency ranges are used by the receive end during signal transmission, to enable the receive end to transmit, in a frequency range, the signal by using a transmission configuration corresponding to the frequency range, in this embodiment of the present invention, further, before the transmission configuration is determined according to the received alternative transmission configuration, the following operation is further included:

if at least two frequency ranges are used during signal transmission, receiving a frequency range corresponding to each of the first CQIs.

When the transmission configuration is determined according to the received alternative transmission configuration, the following operation may be used:

determining, for any one of the at least two frequency ranges, a transmission configuration in the any one frequency range according to the alternative transmission configuration that corresponds to the first CQI corresponding to the any one frequency range.

In this embodiment of the present invention, before the transmission configuration is determined according to the received alternative transmission configuration, the following operation is further included:

receiving the first CQI.

When the transmission configuration is determined according to the received alternative transmission configuration, the following manner may be used:

determining the transmission configuration according to the first CQI and the received alternative transmission configuration.

In this embodiment of the present invention, optionally, a frequency range used by the receive end during signal transmission is agreed upon by the transmit end and the receive end, or is specified by the receive end.

In this embodiment of the present invention, before the alternative transmission configuration that is sent by the transmit end and that corresponds to the specified channel quality indicator CQI, the following operation is further included:

sending, to the transmit end, information about all frequency ranges used by the receive end during signal transmission.

Figure 3:
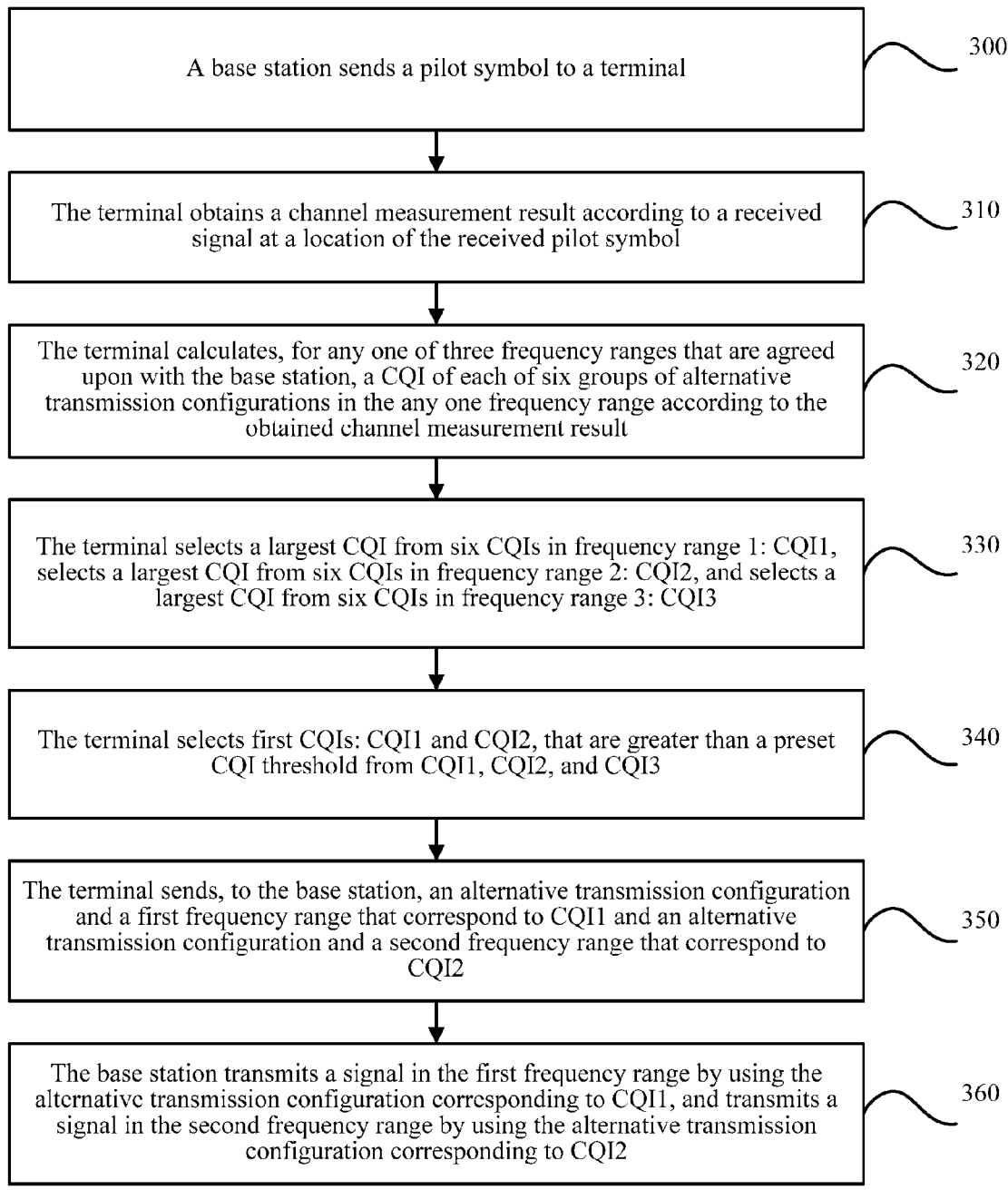
FIG. 3 is an embodiment of signal transmission according to an embodiment of the present invention.

To make this embodiment of the present invention better understood, a specific application scenario is given below to give a further detailed description for the signal transmission process, as shown in FIG. 3:

Step 300: A base station sends a pilot symbol to a terminal.

Step 310: The terminal obtains a channel measurement result according to a received signal at a location of the received pilot symbol.

Step 320: The terminal calculates, for any of three frequency ranges that are agreed upon with the base station, a CQI of each of six groups of alternative transmission configurations in the any one frequency range according to the obtained channel measurement result.

In this step, the alternative transmission configuration includes a waveform parameter, a subcarrier spacing parameter, and a symbol period parameter.

Step 330: The terminal selects a largest CQI from six CQIs in frequency range 1: CQI1, selects a largest CQI from six CQIs in frequency range 2: CQI2, and selects a largest CQI from six CQIs in frequency range 3: CQI3.

Step 340: The terminal selects first CQIs: CQI1 and CQI2, that are greater than a preset CQI threshold from CQI1, CQI2, and CQI3.

Step 350: The terminal sends, to the base station, an alternative transmission configuration and a frequency range 1 that correspond to CQI1 and an alternative transmission configuration and a frequency range 2 that correspond to CQI2.

Step 360: The base station transmits a signal in the frequency range 1 by using the alternative transmission configuration corresponding to CQI1, and transmits a signal in the frequency range 2 by using the alternative transmission configuration corresponding to CQI2.

The foregoing describes a case in which there is only one terminal. If there are at least two terminals, multiple terminals may separately feed back respectively selected first CQIs in the foregoing manner. After receiving feedback of all the terminals and after comprehensively comparing, in a frequency range, the CQIs fed back by all the terminals in the frequency range, the base station selects, in the frequency range, a terminal for transmitting a signal, and a transmission configuration used by the selected terminal to transmit a signal in the frequency range. Then, the selected terminal transmits the signal in the frequency range by using the correspondingly selected transmission configuration.

In conclusion, in this embodiment of the present invention, a technical feature that an alternative transmission configuration corresponding to a selected first CQI is sent to a receive end is used. In this technical feature, the alternative transmission configuration sent to the receive end is an alternative transmission configuration corresponding to the selected first CQI. That is, the alternative transmission configuration sent to the receive end is selected according to the CQI. The CQI may indicate channel quality, and a condition that a channel scattering function is a constant does not need to be satisfied. Therefore, a disadvantage of relatively low accuracy of a signal obtained through demodulation by the receive end in a signal transmission process may be overcome. Moreover, both a CQI and a transmission configuration may be represented by integer numbers. Therefore, a disadvantage of relatively high feedback overheads in the signal transmission process may also be overcome. In addition, calculation of the CQI may be applied to an OFDM system. Therefore, a disadvantage of limited scenarios in the signal transmission process is further overcome.

Figure 4A:
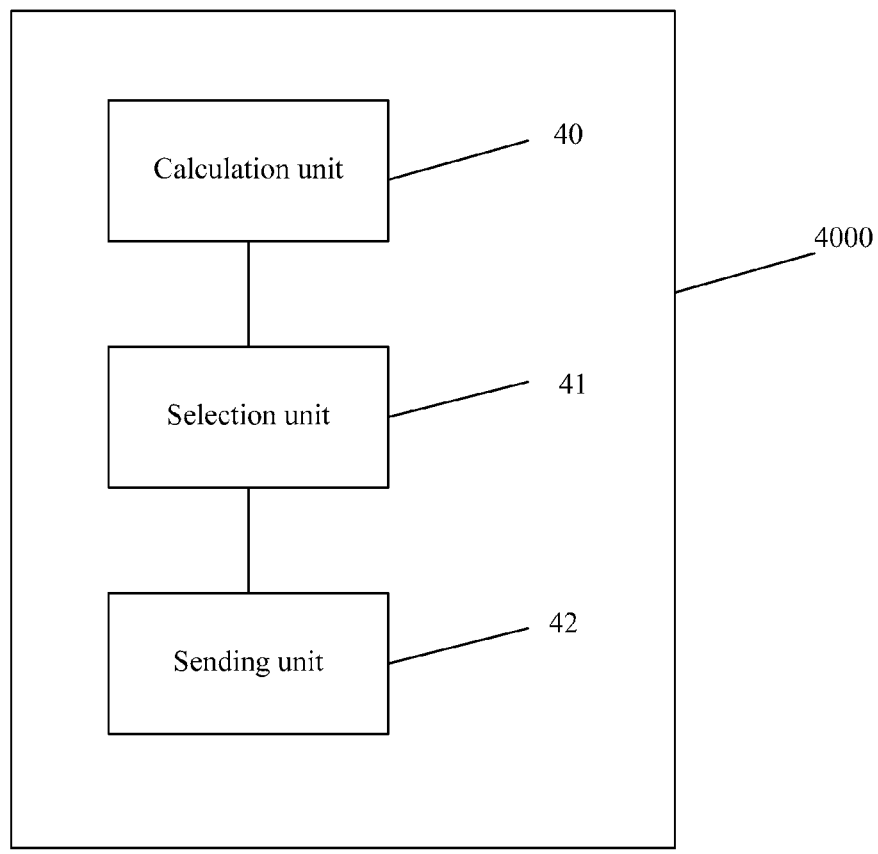
FIG. 4A is a schematic structural diagram of a transmit end according to an embodiment of the present invention.

Based on the technical solution of foregoing corresponding method, referring to FIG. 4A, an embodiment of the present invention provides a transmit end 4000. The transmit end 4000 includes: a calculation unit 40, a selection unit 41, and a sending unit 42.

The calculation unit 40 is configured to calculate a channel quality indicator CQI of each of at least two groups of alternative transmission configurations, where the alternative transmission configuration includes at least one of the following: a waveform parameter, a subcarrier spacing parameter, or a symbol period parameter.

The selection unit 41 is configured to select a first CQI from all the calculated CQIs.

The sending unit 42 is configured to send, to a receive end, an alternative transmission configuration corresponding to the selected first CQI, so that the receive end transmits a signal according to the alternative transmission configuration.

In this embodiment of the present invention, optionally, the calculation unit 40 is specifically configured to:

if the receive end uses one frequency range during signal transmission, calculate a CQI of each of at least two groups of alternative transmission configurations in the one frequency range; or if the receive end uses at least two frequency ranges during signal transmission, calculate, for any one of the at least two frequency ranges, a CQI of each of at least two groups of alternative transmission configurations in the any one frequency range.

In this embodiment of the present invention, optionally, the calculation unit 40 is specifically configured to:

determine a channel measurement result of the any one frequency range;

for any one of the at least two groups of alternative transmission configurations, separately perform the following:

calculating a signal to interference plus noise ratio according to the channel measurement result and the any one group of alternative transmission configurations; and determining the CQI according to the calculated signal to interference plus noise ratio.

In this embodiment of the present invention, optionally, when calculating the signal to interference plus noise ratio according to the channel measurement result and the any one group of alternative transmission configurations, the calculation unit 40 is specifically configured to:

obtain a transmission configuration corresponding to the channel measurement result; and if the any one group of alternative transmission configurations is the same as the obtained transmission configuration, use the signal to interference plus noise ratio, which is calculated according to the channel measurement result and the any one group of alternative transmission configurations, as a signal to interference plus noise ratio of the any one group of alternative transmission configurations.

In this embodiment of the present invention, optionally, when calculating the signal to interference plus noise ratio according to the channel measurement result and the any one group of alternative transmission configurations, the calculation unit 40 is specifically configured to:

obtain a transmission configuration corresponding to the channel measurement result; and if the any one group of alternative transmission configurations is different from the obtained transmission configuration, calculate a signal to interference plus noise ratio of the obtained transmission configuration, and a signal to interference plus noise ratio increment of a signal to interference plus noise ratio of the any one group of alternative transmission configurations compared with the signal to interference plus noise ratio of the obtained transmission configuration; and calculate the signal to interference plus noise ratio of the any one group of alternative transmission configurations according to the signal to interference plus noise ratio of the obtained transmission configuration and the signal to interference plus noise ratio increment; or if the any one group of alternative transmission configurations is different from the obtained transmission configuration, calculate an interference amount between a channel estimation result and a symbol according to the channel measurement result and the any one group of alternative transmission configurations, and calculate a signal to interference plus noise ratio of the any one group of alternative transmission configurations according to the interference amount between the channel estimation result and the symbol.

In this embodiment of the present invention, optionally, the selection unit 41 is specifically configured to:

if the receive end uses one frequency range during signal transmission, select a largest CQI from all CQIs calculated for the one frequency range; and use the largest CQI as the first CQI; or select a smallest CQI from all CQIs calculated for the one frequency range; and use the smallest CQI as the first CQI.

In this embodiment of the present invention, optionally, the selection unit 41 is specifically configured to:

if the receive end uses at least two frequency ranges during signal transmission, select, for any one of the at least two frequency ranges, a largest CQI from all CQIs calculated for the any one frequency range; and use a CQI, which is greater than a preset CQI threshold, in all selected largest CQIs as the first CQI; or sort all selected largest CQIs in descending order; and use the first to $X^{th}$ largest CQIs as the first CQIs, where X is greater than or equal to 1 and is less than or equal to N, and N is a quantity of frequency ranges.

In this embodiment of the present invention, optionally, the selection unit 41 is specifically configured to:

if the receive end uses at least two frequency ranges during signal transmission, select, for any one of the at least two frequency ranges, a smallest CQI from all CQIs calculated for the any one frequency range;

use a CQI, which is less than a preset CQI threshold, in all selected smallest CQIs as the first CQI; or sort all selected smallest CQIs in ascending order; and use the first to $X^{th}$ smallest CQIs as the first CQIs, where X is greater than or equal to 1 and is less than or equal to N, and N is a quantity of frequency ranges.

In this embodiment of the present invention, optionally, the preset CQI threshold is agreed upon by the receive end and the transmit end, or is specified by the receive end; and X is agreed upon by the receive end and the transmit end, or is specified by the receive end.

In this embodiment of the present invention, further, the transmit end further includes a receiving unit, configured to receive the preset CQI threshold and/or X sent by the receive end.

In this embodiment of the present invention, optionally, a frequency range used by the receive end during signal transmission is agreed upon by the transmit end and the receive end, or is specified by the receive end.

In this embodiment of the present invention, further, the transmit end further includes a receiving unit, where the receiving unit is configured to receive information that is sent by the receive end and that is about a frequency range used by the receive end during signal transmission.

In this embodiment of the present invention, further, the sending unit 42 is further configured to:

if the receive end uses at least two frequency ranges during signal transmission, send, to the receive end, a frequency range corresponding to each selected first CQI.

In this embodiment of the present invention, further, the sending unit 42 is further configured to:

send the first CQI to the receive end.

Figure 4B:
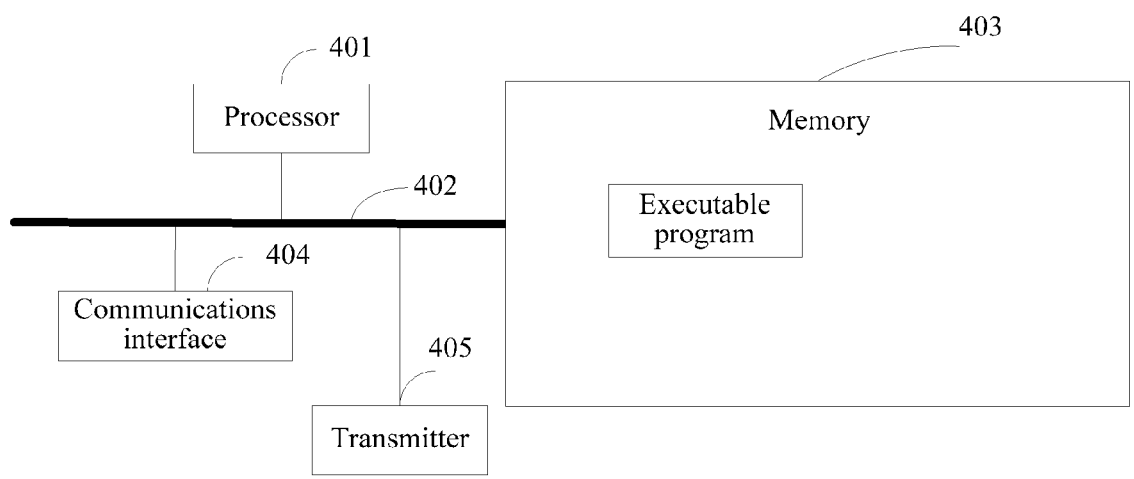
FIG. 4B is another schematic structural diagram of a transmit end according to an embodiment of the present invention.

As shown in FIG. 4B, FIG. 4B is another schematic structural diagram of the transmit end 4000 according to an embodiment of the present invention. The transmit end 4000 includes at least one processor 401, a communications bus 402, a memory 403, at least one communications interface 404, and a transmitter 405.

The communications bus 402 is configured to implement connection and communication between the foregoing components, and the communications interface 404 is configured to connect to and communicate with an external device.

The memory 403 is configured to store executable program code. The processor 401 executes the program code, to:

calculate a channel quality indicator CQI of each of at least two groups of alternative transmission configurations, where the alternative transmission configuration includes at least one of the following: a waveform parameter, a subcarrier spacing parameter, or a symbol period parameter; and select a first CQI from all the calculated CQIs.

The transmitter 405 is configured to send, to a receive end, an alternative transmission configuration corresponding to the selected first CQI, so that the receive end transmits a signal according to the alternative transmission configuration.

The transmitter 405 in FIG. 4B may further perform other operations performed by the sending unit 42 in FIG. 4A. The processor 401 may further perform other operations performed by the calculation unit 40 and the selection unit 41 in FIG. 4A.

FIG. 4B may further include a receiver. The receiver is configured to perform the operations performed by the receiving unit in the embodiment of FIG. 4A.

Figure 5A:
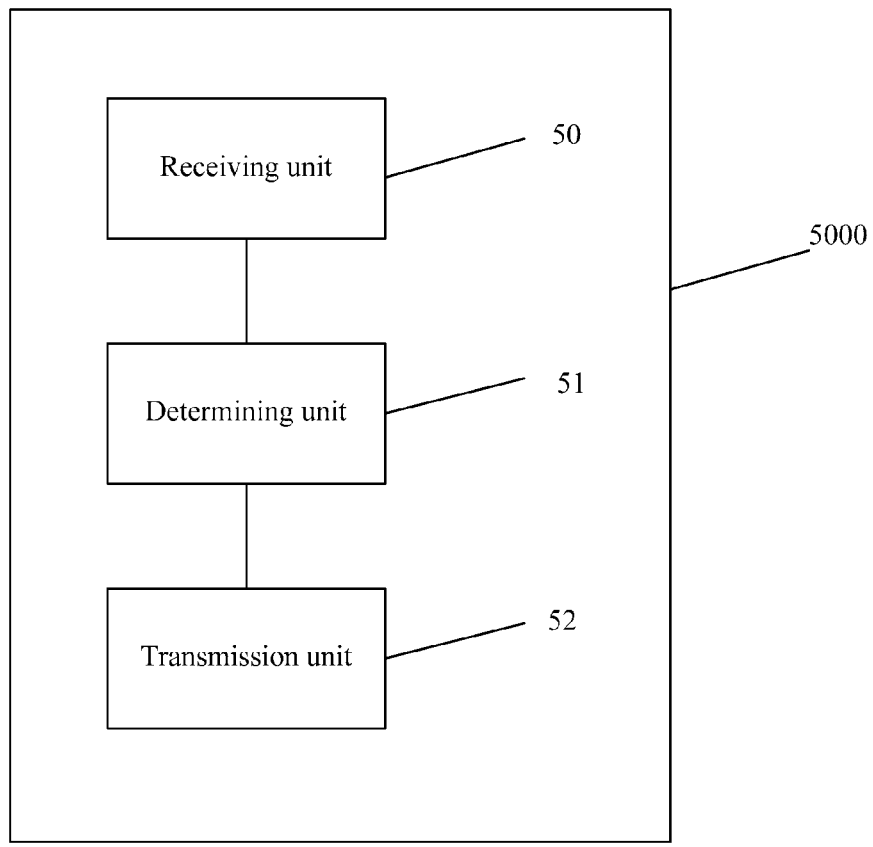
FIG. 5A is a schematic structural diagram of a receive end according to an embodiment of the present invention.

Based on the technical solution of foregoing corresponding method, referring to FIG. 5A, an embodiment of the present invention provides a receive end 5000. The receive end 5000 includes: a receiving unit 50, a determining unit 51, and a transmission unit 52.

The receiving unit 50 is configured to receive an alternative transmission configuration that is sent by a transmit end and that corresponds to a first channel quality indicator CQI, where the first CQI is selected by the transmit end from CQIs calculated for all alternative transmission configurations, and the alternative transmission configuration includes at least one of the following: a waveform parameter, a subcarrier spacing parameter, or a symbol period parameter.

The determining unit 51 is configured to determine a transmission configuration according to the received alternative transmission configuration.

The transmission unit 52 is configured to transmit a signal according to the determined transmission configuration.

In this embodiment of the present invention, further, the receiving unit 50 is further configured to:

if at least two frequency ranges are used during signal transmission, receive a frequency range corresponding to each of the first CQIs; and The determining unit 51 is specifically configured to:

determine, for any one of the at least two frequency ranges, a transmission configuration in the any one frequency range according to the alternative transmission configuration that corresponds to the first CQI corresponding to the any one frequency range.

In this embodiment of the present invention, further, the receiving unit 50 is further configured to:

receive the first CQI.

The determining unit 51 is specifically configured to:

determine the transmission configuration according to the first CQI and the received alternative transmission configuration.

In this embodiment of the present invention, optionally, a frequency range used by the receive end during signal transmission is agreed upon by the transmit end and the receive end, or is specified by the receive end.

In this embodiment of the present invention, further, the receive end further includes a sending unit. The sending unit is further configured to:

send, to the transmit end, information about all frequency ranges used by the receive end during signal transmission.

Figure 5B:
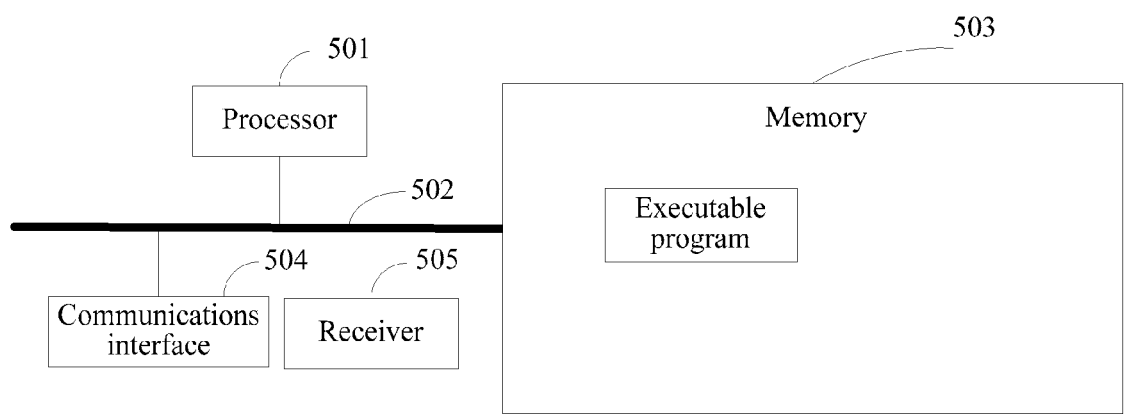
FIG. 5B is another schematic structural diagram of a receive end according to an embodiment of the present invention.

As shown in FIG. 5B, FIG. 5B is another schematic structural diagram of the receive end 5000 according to an embodiment of the present invention. The receive end 5000 includes at least one processor 501, a communications bus 502, a memory 503, at least one communications interface 504, and a receiver 505.

The communications bus 502 is configured to implement connection and communication between the foregoing components, and the communications interface 504 is configured to connect to and communicate with an external device.

The memory 503 is configured to store executable program code.

The receiver 505 is configured to receive an alternative transmission configuration that is sent by a transmit end and that corresponds to a first channel quality indicator CQI, where the first CQI is selected by the transmit end from CQIs calculated for all alternative transmission configurations, and the alternative transmission configuration includes at least one of the following: a waveform parameter, a subcarrier spacing parameter, or a symbol period parameter.

The processor 501 executes the program code, to:

determine a transmission configuration according to the received alternative transmission configuration; and transmit a signal according to the determined transmission configuration.

The receiver 505 in FIG. 5B may be further configured to perform other operations performed by the receiving unit 50 in FIG. 5A. The processor 501 may further perform other operations performed by the determining unit 51 and the transmission unit 52 in FIG. 5A.

FIG. 5B may further include a transmitter. The transmitter is configured to perform the operations performed by the sending unit in the embodiment of FIG. 5A.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the embodiments of the present invention without departing from the scope of the embodiments of the present invention. The present invention is intended to cover these modifications and variations provided that they fall within the scope of protection defined by the following claims and their equivalent technologies.

What is claimed is:

1. A signal transmission method, comprising:

calculating a channel quality indicator (CQI) of each of at least two groups of alternative transmission configurations, wherein each alternative transmission configuration comprises at least one of the following: a waveform parameter, a subcarrier spacing parameter, or a symbol period parameter;

selecting a first CQI from all the calculated CQIs; and sending, to a receive end, a first alternative transmission configuration corresponding to the selected first CQI, so that the receive end transmits a signal according to the first alternative transmission configuration;

wherein the calculating a CQI of each of at least two groups of alternative transmission configurations comprises at least one of:

if the receive end uses one frequency range during signal transmission, calculating a CQI of each of at least two groups of alternative transmission configurations in the one frequency range;

and if the receive end uses at least two frequency ranges during signal transmission, calculating, for any one of the at least two frequency ranges, a CQI of each of at least two groups of alternative transmission configurations in the any one of the at least two frequency ranges.

2. The method according to claim 1, wherein the calculating a channel quality indicator (CQI) of each of at least two groups of alternative transmission configurations in the any one frequency range comprises:

determining a channel measurement result of the any one frequency range;

for any one of the at least two groups of alternative transmission configurations, separately performing the following:

calculating a signal to interference plus noise ratio according to the channel measurement result and the any one group of alternative transmission configurations; and determining the CQI according to the calculated signal to interference plus noise ratio.

3. The method according to claim 2, wherein the calculating a signal to interference plus noise ratio according to the channel measurement result and the any one group of alternative transmission configurations comprises at least one of:

obtaining a transmission configuration corresponding to the channel measurement result; and if the any one group of alternative transmission configurations is the same as the obtained transmission configuration, using the signal to interference plus noise ratio, which is calculated according to the channel measurement result and the any one group of alternative transmission configurations, as a signal to interference plus noise ratio of the any one group of alternative transmission configurations;

and obtaining a transmission configuration corresponding to the channel measurement result; and if the any one group of alternative transmission configurations is different from the obtained transmission configuration, calculating a signal to interference plus noise ratio of the obtained transmission configuration, and a signal to interference plus noise ratio increment of a signal to interference plus noise ratio of the any one group of alternative transmission configurations compared with the signal to interference plus noise ratio of the obtained transmission configuration; and calculating the signal to interference plus noise ratio of the any one group of alternative transmission configurations according to the signal to interference plus noise ratio of the obtained transmission configuration and the signal to interference plus noise ratio increment; or if the any one group of alternative transmission configurations is different from the obtained transmission configuration, calculating an interference amount between a channel estimation result and a symbol according to the channel measurement result and the any one group of alternative transmission configurations, and calculating a signal to interference plus noise ratio of the any one group of alternative transmission configurations according to the interference amount between the channel estimation result and the symbol.

4. The method according to claim 1, wherein the selecting a first CQI from all the calculated CQIs comprises at least one of:

if the receive end uses one frequency range during signal transmission, selecting a largest CQI from all CQIs calculated for the one frequency range; and using the largest CQI as the first CQI; or selecting a smallest CQI from all CQIs calculated for the one frequency range; and using the smallest CQI as the first CQI; and if the receive end uses at least two frequency ranges during signal transmission, selecting, for any one of the at least two frequency ranges, a largest CQI from all CQIs calculated for the any one frequency range; and using a CQI, which is greater than a preset CQI threshold, in all selected largest CQIs as the first CQI; or sorting all selected largest CQIs in descending order; and using the first to $X^{th}$ largest CQIs as the first CQIs, wherein X is greater than or equal to 1 and is less than or equal to N, and N is a quantity of the at least two frequency ranges;

and if the receive end uses at least two frequency ranges during signal transmission, selecting, for any one of the at least two frequency ranges, a smallest CQI from all CQIs calculated for the any one frequency range; and using a CQI, which is less than a preset CQI threshold, in all selected smallest CQIs as the first CQI; or sorting all selected smallest CQIs in ascending order; and using the first to $X^{th}$ smallest CQIs as the first CQIs, wherein X is greater than or equal to 1 and is less than or equal to N, and N is a quantity of the at least two frequency ranges.

5. The method according to claim 4, wherein the preset CQI threshold is agreed upon by the receive end and a transmit end, or is specified by the receive end; and X is agreed upon by the receive end and the transmit end, or is specified by the receive end.

6. The method according to claim 1, after the selecting a first CQI from all the calculated CQIs, further comprising at least one of:

if the receive end uses at least two frequency ranges during signal transmission, sending, to the receive end, a frequency range corresponding to each selected first CQI;

and sending the first CQI to the receive end.

7. A signal transmission method, comprising:

receiving an alternative transmission configuration that is sent by a transmit end and that corresponds to a first channel quality indicator (CQI), wherein the first CQI is selected by the transmit end from CQIs calculated for all alternative transmission configurations, and each alternative transmission configuration comprises at least one of the following: a waveform parameter, a subcarrier spacing parameter, or a symbol period parameter;

determining a transmission configuration according to the received alternative transmission configuration; and transmitting a signal according to the determined transmission configuration;

before the determining a transmission configuration according to the received alternative transmission configuration, further comprising:

receiving the first CQI, wherein the determining a transmission configuration according to the received alternative transmission configuration comprises:

determining the transmission configuration according to the first CQI and the received alternative transmission configuration.

8. The method according to claim 7, before the determining a transmission configuration according to the received alternative transmission configuration, further comprising:

if at least two frequency ranges are used during signal transmission, receiving a frequency range corresponding to each of the first CQIs, wherein the determining a transmission configuration according to the received alternative transmission configuration comprises:

determining, for any one of the at least two frequency ranges, a transmission configuration in the any one frequency range according to an alternative transmission configuration that corresponds to the first CQI corresponding to the any one frequency range.

9. A transmit end, comprising:

a processor, configured to calculate a channel quality indicator (CQI) of each of at least two groups of alternative transmission configurations, wherein each alternative transmission configuration comprises at least one of the following: a waveform parameter, a subcarrier spacing parameter, or a symbol period parameter;

wherein the processor is further configured to select a first CQI from all the calculated CQIs; and a transmitter, configured to send, to a receive end, a first alternative transmission configuration corresponding to the selected first CQI, so that the receive end transmits a signal according to the first alternative transmission configuration;

wherein the processor is further configured to perform at least one of:

if the receive end uses one frequency range during signal transmission, calculate a CQI of each of at least two groups of alternative transmission configurations in the one frequency range; and if the receive end uses at least two frequency ranges during signal transmission, calculate, for any one of the at least two frequency ranges, a CQI of each of at least two groups of alternative transmission configurations in the any one of the at least two frequency ranges.

10. The transmit end according to claim 9, wherein when the processor is further configured to calculate, for any one of the at least two frequency ranges, a CQI of each of at least two groups of alternative transmission configurations in the any one frequency range,
determine a channel measurement result of the any one frequency range;
for any one of the at least two groups of alternative transmission configurations, separately perform the following:
calculating a signal to interference plus noise ratio according to the channel measurement result and the any one group of alternative transmission configurations; and
determining the CQI according to the calculated signal to interference plus noise ratio.

11. The transmit end according to claim 10, wherein when calculating the signal to interference plus noise ratio according to the channel measurement result and the any one group of alternative transmission configurations, the processor is further configured to perform at least one of:
obtain a transmission configuration corresponding to the channel measurement result; and
if the any one group of alternative transmission configurations is the same as the obtained transmission configuration, use the signal to interference plus noise ratio, which is calculated according to the channel measurement result and the any one group of alternative transmission configurations, as a signal to interference plus noise ratio of the any one group of alternative transmission configurations;
and
obtain a transmission configuration corresponding to the channel measurement result; and
if the any one group of alternative transmission configurations is different from the obtained transmission configuration, calculate a signal to interference plus noise ratio of the obtained transmission configuration, and a signal to interference plus noise ratio increment of a signal to interference plus noise ratio of the any one group of alternative transmission configurations compared with the signal to interference plus noise ratio of the obtained transmission configuration; and calculate the signal to interference plus noise ratio of the any one group of alternative transmission configurations according to the signal to interference plus noise ratio of the obtained transmission configuration and the signal to interference plus noise ratio increment; or if the any one group of alternative transmission configurations is different from the obtained transmission configuration, calculate an interference amount between a channel estimation result and a symbol according to the channel measurement result and the any one group of alternative transmission configurations, and calculate a signal to interference plus noise ratio of the any one group of alternative transmission configurations according to the interference amount between the channel estimation result and the symbol.

12. The transmit end according to claim 9, wherein the processor is further configured to perform at least one of:
if the receive end uses one frequency range during signal transmission, select a largest CQI from all CQIs calculated for the one frequency range; and
use the largest CQI as the first CQI; or select a smallest CQI from all CQIs calculated for the one frequency range; and
use the smallest CQI as the first CQI,
and
if the receive end uses at least two frequency ranges during signal transmission, select, for any one of the at least two frequency ranges, a largest CQI from all CQIs calculated for the any one frequency range;
use a CQI, which is greater than a preset CQI threshold, in all selected largest CQIs as the first CQI; or
sort all selected largest CQIs in descending order; and
use the first to $X^{th}$ largest CQIs as the first CQIs, wherein X is greater than or equal to 1 and is less than or equal to N, and N is a quantity of the at least two frequency ranges,
and
if the receive end uses at least two frequency ranges during signal transmission, select, for any one of the at least two frequency ranges, a smallest CQI from all CQIs calculated for the any one of the at least two frequency ranges; and
use a CQI, which is less than a preset CQI threshold, in all selected smallest CQIs as the first CQI; or
sort all selected smallest CQIs in ascending order; and
use the first to $X^{th}$ smallest CQIs as the first CQIs, wherein X is greater than or equal to 1 and is less than or equal to N, and N is a quantity of the at least two frequency ranges.

13. The transmit end according to any one of claim 9, further comprising a receiver, wherein the receiver is configured to receive information that is sent by the receive end and that is about a frequency range used by the receive end during signal transmission.

14. A receive end, comprising:
a receiver, configured to receive an alternative transmission configuration that is sent by a transmit end and that corresponds to a first channel quality indicator (CQI), wherein the first CQI is selected by the transmit end from CQIs calculated for all alternative transmission configurations, and the alternative transmission configuration comprises at least one of the following: a waveform parameter, a subcarrier spacing parameter, or a symbol period parameter;
a processor, configured to determine a transmission configuration according to the received alternative transmission configuration; and
a transmitter, configured to transmit a signal according to the determined transmission configuration;
wherein the receiver is further configured to:
receive the first CQI; and
the processor is further configured to:
determine the transmission configuration according to the first CQI and the received alternative transmission configuration.

15. The receive end according to claim 14, wherein the receiver is further configured to:
if at least two frequency ranges are used during signal transmission, receive a frequency range corresponding to each of the first CQIs; and
the processor is receiver configured to:
determine, for any one of the at least two frequency ranges, a transmission configuration in the any one of the at least two frequency ranges according to the alternative transmission configuration that corresponds to the first CQI corresponding to the any one of the at least two frequency ranges.

16. The receive end according to claim 14, wherein the transmitter is further configured to send, to the transmit end, information about all frequency ranges used by the receive end during signal transmission.

* * * * *